United States Patent [19]

Ueda et al.

[11] Patent Number: 4,591,035
[45] Date of Patent: May 27, 1986

[54] CONTROL DEVICE FOR CONTROLLING SELECTION OF GEAR RATIO IN SECONDARY TRANSMISSION

[75] Inventors: Masahiro Ueda; Shigeo Shigeyama, both of Aichi, Japan

[73] Assignee: Toyota Jidosha Kabushiki Kaisha, Toyota, Japan

[21] Appl. No.: 592,011

[22] Filed: Mar. 21, 1984

[30] Foreign Application Priority Data

Jun. 3, 1983 [JP] Japan .................................. 58-99236

[51] Int. Cl.$^4$ ............................................. B60K 41/22
[52] U.S. Cl. ................................ 192/3.59; 192/30 W
[58] Field of Search .................... 192/3.59, 3.58, 3.57, 192/0.03, 0.092, 3.61, 30 W; 74/865, 868, 866, 867

[56] References Cited

U.S. PATENT DOCUMENTS

| 2,581,291 | 1/1952 | Randol | 192/3.59 |
| 3,572,176 | 3/1971 | Bildat | 192/0.092 |
| 3,667,577 | 6/1972 | Weymann | 102/0.092 |
| 4,072,220 | 2/1978 | Hamada | 192/3.59 |
| 4,505,364 | 3/1985 | Goucher et al. | 192/3.58 |
| 4,516,669 | 3/1985 | Bostrom | 192/3.58 |

Primary Examiner—George H. Krizmanich
Attorney, Agent, or Firm—Cushman, Darby & Cushman

[57] ABSTRACT

A disconnected situation of a clutch is detected by a clutch sensor and an actuator performing selection of gear ratio in a secondary transmission is controlled by a control circuit in response to detected signals of the clutch sensor, whereby the selection of the gear ratio is conducted only when the clutch is put in its disconnected situation.

28 Claims, 3 Drawing Figures

CONTROL DEVICE FOR CONTROLLING SELECTION OF GEAR RATIO IN SECONDARY TRANSMISSION

BACKGROUND OF THE INVENTION

1. Field of the Invention

The present invention relates to a control device for controlling selection of gear ratio in secondary transmission provided in a vehicle which is used in addition to an ordinary main transmission.

2. Description of the Prior Art

The secondary transmission is connected to the main transmission in series to change the gear ratio thereof and it has widely been used in such a vehicle as an automobile for improving a fuel consumption ratio in high-speed and middle-speed running situations of the vehicle and decreasing engine noises of the vehicle.

In a conventional device selecting the gear ratio in such a secondary transmission, however, the selection of the gear ratio in the secondary transmission can be conducted without depressing a clutch pedal. Accordingly, there is a problem that the gears in the secondary transmission are sometimes over-loaded due to misoperations by a driver in the vehicle.

SUMMARY OF THE INVENTION

In view of the above problem, the present invention has as its object the provision of a control device for controlling selection of gear ratio in a secondary transmission capable of completely preventing the gears in the secondary transmission from being injured.

For achieving the above object, a control device for controlling selection of gear ratio in a secondary transmission according to the present invention comprises drive means performing the selection of the gear ratio in the secondary transmission, a clutch sensor detecting a disconnected situation of a clutch and control means controlling the drive means in response to detected signals of the clutch sensor whereby the selection of the gear ratio in the secondary transmission is conducted only when the clutch is placed in its disconnected situation.

In the present invention, therefore, unless the clutch pedal is operated and the clutch is put in its complete disconnected situation, the selection of the gear ratio in the secondary transmission can not be conducted, so that the gears in the secondary transmission are prevented from being injured due to misoperations by the driver at the times of the selection of the gear ratio in the secondary transmission.

Description will hereinunder be given of an embodiment of the present invention with reference to the drawings.

DESCRIPTION OF THE PREFERRED EMBODIMENT

In the present embodiment the gear ratio in a secondary transmission is selected by the following drive means.

Figure 1:
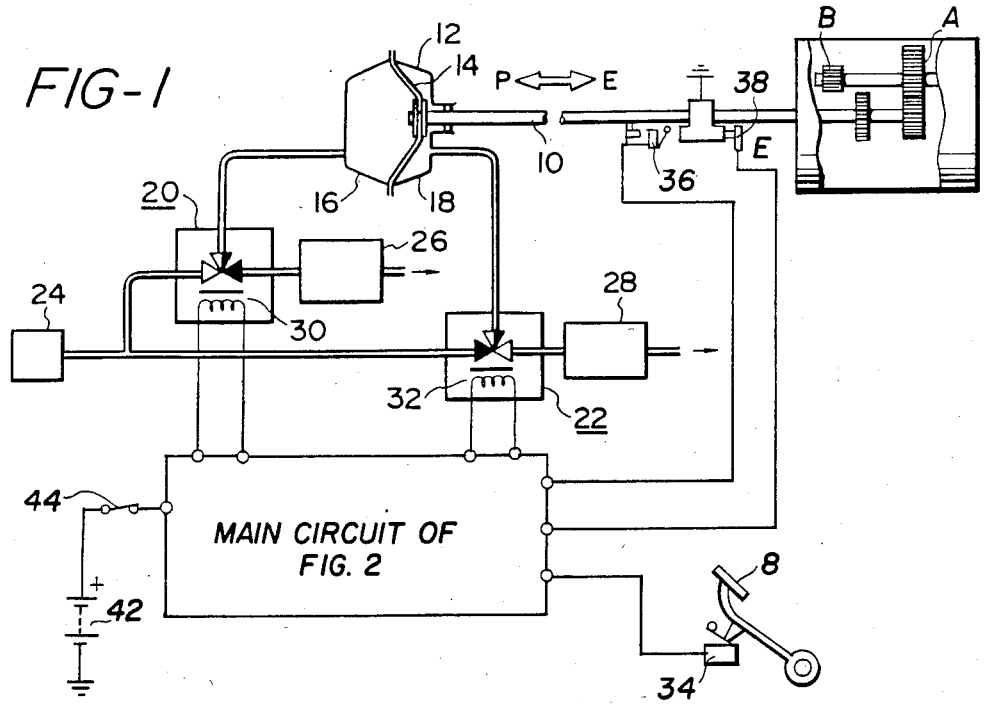
FIG. 1 is a structurally explanatory view of drive means in an embodiment according to the present invention.

FIG. 1 shows the structure of the drive means in which the gear ratio A or B in the second transmission 1 is selected, or shifted, by driving a rod 10 in left and right directions shown in FIG. 1.

The secondary transmission 1 is disposed at a front or a rear place of a main transmission in order to improve a fuel consumption ratio in high-speed and low-speed running situations of a vehicle and to decrease the engine noises of the vehicle. When the rod 10 is driven in the right direction in FIG. 1 the gear ratio A in the transmission is selected to a high-geared economic situation (E), and, when the rod 10 is driven in the left direction in FIG. 1, the gear ratio B is selected to a low-geared powerful situation (P).

The rod 10 is driven by an actuator 12 worked by air pressure and, therefore, the actuator 12 includes a diaphragm 14 connected to the rod 10 and a first and a second air chambers 16 and 18 formed at the left and right sides of the diaphragm 14 in FIG. 1.

The first and the second air chambers 16 and 18 are connected to pressure-regulating openings 2 and 3 of solenoid valves 20 and 22, respectively. A low-pressure opening 4 and 5 of each of the solenoid valves 20 and 22 is connected to a vacuum pump 24, and high-pressure openings 6 and 17 of the solenoid valves 20 and 22 are respectively opened to the atmosphere through air filters 26 and 28.

Accordingly, when a solenoid 30 of the solenoid valve 20 is turned on electrically, the pressure in the first air chamber 16 is reduced and, when the solenoid 30 is turned off electrically, the pressure in the first chamber 16 is returned to atmospheric pressure. Also, when a solenoid 32 of the solenoid valve 22 is turned on electrically, the pressure in the second air chamber 18 is reduced, and, when the solenoid 32 is turned off electrically, the pressure in the second air chamber 18 is returned to atmospheric pressure. Thus, when only the solenoid 30 is turned on electrically, the gear ratio in the secondary transmission is selected to the powerful situation (P), and when only the solenoid 32 is turned on electrically, the gear ratio is selected to the economic situation (E). In addition, when both the solenoids 30 and 32 are simultaneously turned off electrically, both the the first and second air chambers 16 and 18 are returned to atmospheric pressure, so that the gear ratio in the secondary transmission is not selected, i.e., the previous gear ratio is maintained.

Figure 2:
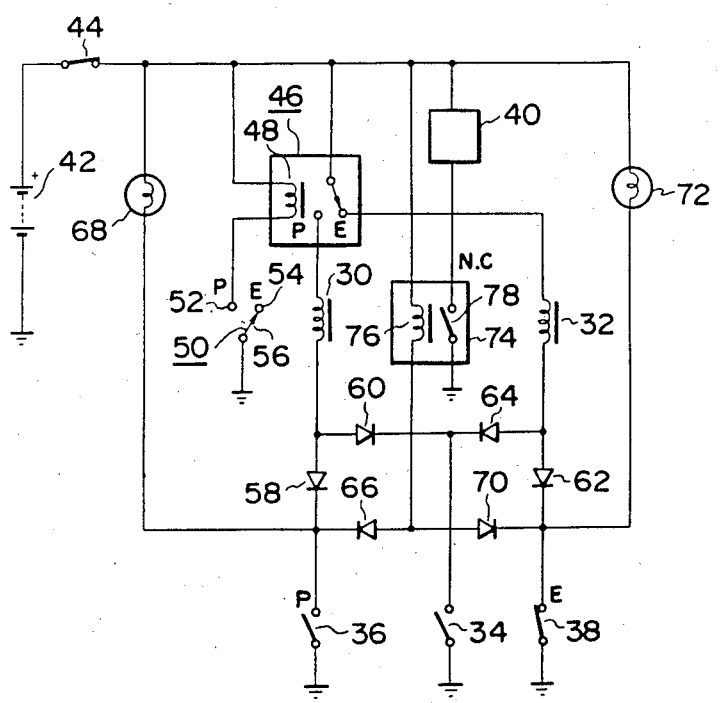
FIG. 2 is a circuit diagram of control means controlling the drive means shown in FIG. 1.

FIG. 2 shows the structure of control means which controls the drive means.

The control means is capable of controlling the drive means in response to detecting signals of a clutch sensor 34 detecting a disconnected situation of a clutch 8 The control means is capable also of to cause a continually signal sound generator to generate signal sound until the selection of the gear ratio is completed by detecting completion of the selection of the gear ratio in the secondary transmission. The detect means detects this completion according to the present embodiment, and includes a switch 36 which is closed when the selection of the gear ratio is accomplished to the powerful situation (P) and another switch 38 closed when it is accomplished to the economic situation (E). The signal sound generator also has a buzzer 40.

In FIG. 2 a high potential terminal of a power source, or battery, 42 is connected to a switching relay 46 through an ignition switch 44. In the switching relay 46, the contact representing an economy situation, is connected to one end of the solenoid 32.

Also, one end of a control coil 48 in the switching relay 46 is connected to the ignition switch 44, the other end thereof being connected to a powerful situation contact 52 of an operation switch 50. The operation switch 50 is also provided with an economic situation contact 54 and a movable contact 56 contacting alternately with the contacts 52 and 54, the movable contact 56 being grounded.

The other end of the solenoid 30 is connected to the respective anodes of diodes 58 and 60, and the other end of the solenoid 32 is connected to the respective anodes of diodes 62 and 64. The cathode of the diode 58 is connected to the cathode of a diode 66 and one end of the switch 36, the other end thereof being grounded, and the connecting point of the diodes 58 and 66 and the switch 36 is connected to one end of a powerful situation-indicating lamp 68, the other end thereof being connected to the ignition switch 44.

The cathode of the diode 62 is connected to the cathode of a diode 70 and one end of the switch 38, the other end thereof being grounded, and the connecting point of the diodes 62 and 70 and the switch 38 is connected to one end of an economic situation-indicating lamp 72, the other end thereof being connected to the ignition switch 44. The cathodes of the diodes 60 and 64 are connected to one end of the clutch sensor 34, the other end thereof being grounded.

In addition, the respective anodes of the diodes 66 and 70 are connected to one end of a control coil 76 in a buzzer relay 74, the other end thereof being connected to the ignition switch 44. Also, one end of a relay switch 78 in the buzzer relay 74 controlled to its on and off situations by the control coil 76 is grounded, the other end thereof being connected to one end of the buzzer 40 the other end of which is connected to the ignition switch 44.

Description will now be given of operation of the control device for controlling selection of gear ratio in secondary transmission according to the above embodiment with reference to the timing chart shown in FIG. 3.

Figure 3:
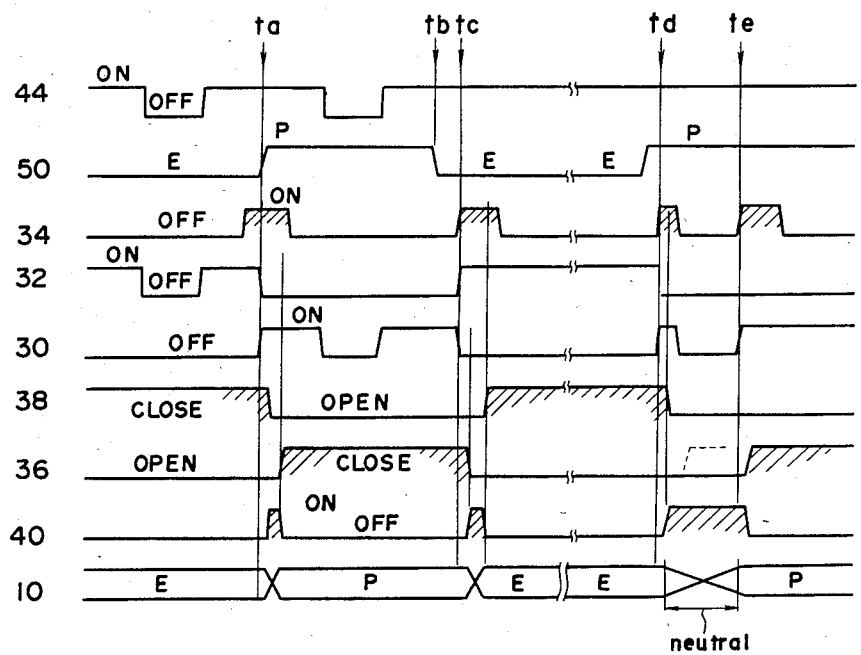
FIG. 3 is a timing chart explaining action of the embodiment according to the present invention.

In FIG. 3 the gear ratio in the secondary transmission is preliminarily positioned to the economic situation (E). Thereafter, when the ignition switch 44 is opened and a vehicle is stopped, neither the solenoid 30 nor the solenoid 32 are excited and, therefore, the gear ratio is kept in the economic situation (E).

In case that the ignition switch 44 is closed and the vehicle begins to run, the detecting signal of the clutch sensor 34 rises when the clutch is operated and thereby put in its disconnected situation.

In this condition, if the movable contact 56 of the operation switch 50 is operated to be connected to the powerful situation contact 52 at a time ta, the control coil 48 is excited, whereby a current passing through the solenoid 32 is stopped and simultaneously therewith a current begins to pass through the solenoid 30. As a result, the gear in the secondary transmission is moved in the direction of the powerful situation (P) by the rod 10. When the gear disengages from the economic situation (E) at the beginning of the drive, the switch 38 is opened and simultaneously therewith the buzzer 40 is turned on electrically to generate signal sound.

Thus, while the gear in the secondary transmission is being switched from one position to the other position the buzzer 40 generates the signal sound, whereby a driver in the vehicle can confirm that the secondary transmission is selecting a different the gear ratio.

In addition, when the selection of the gear ratio engages in the powerful situation (P), the switch 36 is closed to stop the buzzer 40 and simultaneously therewith to turn on the powerful situation-indicating lamp 68.

Accordingly, after the driver confirms the stop of the buzzer 40 and the turning-on of the lamp 68, the driver can safely return the clutch to the connected situation. As a result, the clutch sensor 34 is opened at the time of the clutch connection.

Thereafter, when the ignition switch 44 is opened so that the vehicle stops running, currents passing through the clutch sensor 34 and the solenoid 32 are simultaneously stopped whereby the gear ratio in the secondary transmission is kept in the powerful situation (P).

Furthermore, after the vehicle begins to run, the movable contact 56 is switched to the economic situation contact 54 at a time tb and the clutch is put in the disconnected situation at time tc, whereby a current stops passing through the solenoid 30 and a current begins to pass through the solenoid 32. As a result, the rod 10 is driven to the economic situation (E), whereby the switch 38 is opened and the buzzer 40 is operated. In these conditions, however, the operation of the clutch is stopped halfway, in which the clutch is put in its connected situation and the selection of the gear ratio in the secondary transmission is not conducted completely.

Accordingly, both the switches 36 and 38 are kept in their opened situations, so that the buzzer 40 continues to operate and neither the powerful situation-indicating lamp 68 nor the economic situation-indicating lamp 72 are turned on.

That is, the driver in the vehicle can recognize the continuous signal sound of the buzzer 40 as a warning and can confirm the lights-out of the lamps 68 and 72, whereby he judges that the gear in the secondary transmission is placed in its neutral position. In accordance with the above judgement, he operates the clutch at a time te, again, so that the rod 10 is driven again to the powerful situation (P). Thus, the selection of the gear ratio in the secondary transmission is securely carried out.

As set forth above, in this embodiment the selection of the gear ratio in the secondary transmission can be performed only in the disconnected situation of the clutch, whereby the gear in the secondary transmission is prevented from being injured due to misoperations by the driver.

In the embodiment, also, the driver is informed that the gear in the secondary transmission is under its moving situation, the movement of the gear is accomplished and the gear is placed in the neutral situation by the buzzer 40, the powerful situation-indicating lamp 68 and the economic situation-indicating lamp 72, so that he is prevented from misoperating the secondary transmission.

Furthermore, in this embodiment the selection of the gear ratio in the secondary transmission is performed only by the operations of the clutch and the operation switch 50, so that the operation for selecting the gear ratio is made easy.

What is claimed is:

1. A control device for controlling selection of a gear ratio in a secondary transmission in which a driver manually actuates a clutch, comprising:
   (a) drive means for performing selection of the gear ratio in the secondary transmission;
   (b) a clutch sensor which detects a disconnected situation of the clutch and produces a detect signal indicative thereof; and
   (c) control means for preventing misoperation of the clutch by the driver by controlling the drive means in response to the detect signal detected by the clutch sensor and selecting the gear ratio only when the clutch is in the disconnected situation for preventing the secondary transmission from being damaged due to a driver's misoperation of the clutch.

2. A control device as set forth in claim 1, wherein the drive means comprises an actuator including a diaphragm for performing the selection of the gear ratio and a first and a second air chamber formed at both sides of the diaphragm, a first and a second solenoid valve, pressure-regulating openings thereof being connected respectively to the first air chamber and the second air chamber and high-pressure openings thereof being opened to the atmosphere, and a vacuum pump connected to low-pressure openings of both the first and the second solenoid valves.

3. A control device as set forth in claim 2, further comprising a filter wherein each of the high-pressure openings of the first solenoid valve and the second solenoid valve is opened to the atmosphere through a filter.

4. A control device as set forth in claim, wherein the clutch sensor comprises a first switch which is switched on when the clutch is subjected to its disconnection.

5. A control device as set forth in claim 2, wherein the clutch sensor comprises a first switch which is switched on when the clutch is subjected to its disconnection.

6. A control device as set forth in claim 5, wherein the control means comprises an operation switch operated when the gear ratio is selected in the secondary transmission and a switching relay including two contacts and a control coil, one of the contacts being connected to one end of the first switch through one of the solenoids of the first and second solenoid valves and the other of the contacts being connected to the one end of the first switch through the other of the solenoids, and switching between the two contacts being performed by the control coil excited in response to operation of the operation switch.

7. A control device as set forth in claim 2, wherein the control means controls current passing through the solenoids of the respective first and second solenoid valves to control the selection of the gear ratio performed by the diaphragm.

8. A control device as set forth in claim 6, wherein the control means controls current passing through the solenoids of the respective first and second solenoid valves to control the selection of the gear ratio performed by the diaphragm.

9. A control device controlling selection of gear ratio in a secondary transmission which includes a clutch, comprising:
   (a) drive means for performing selection of the gear ratio in the secondary transmission;
   (b) a clutch sensor detecting a disconnected situation of the clutch;
   (c) control means for controlling the drive means in response to a detect signal detected by the clutch sensor to select the gear ratio only when the clutch is placed in its disconnected situation, whereby the secondary transmission is prevented from being injured due to a driver's misoperation;
   (d) detect means for detecting completion of the selection of the gear ratio in the secondary transmission; and
   (e) a signal sound generator continuing to generate signal sound in response to a detect signal detected by the detect means until the selection of the gear ratio is accomplished.

10. A control device as set forth in claim 9, wherein the drive means comprises an actuator including a diaphragm for performing the selection of the gear ratio, and a first and a second air chamber formed at both sides of the diaphragm, a first and a second solenoid valve, pressure-regulating openings thereof being connected respectively to the first air chamber and the second air chamber and high-pressure openings thereof being opened to the atmosphere, and a vacuum pump connected to low-pressure openings of both the first and the second solenoid valves.

11. A control device as set forth in claim 10, wherein each of the high-pressure openings of the first solenoid valve and second solenoid valve is opened to the atmosphere through a filter.

12. A control device as set forth in claim 9, wherein the clutch sensor comprises a first switch which is switched on when the clutch is subjected to its disconnection.

13. A control device as set forth in claim 10, wherein the clutch sensor comprises a first switch which is switched on when the clutch is subjected to its disconnection.

14. A control device as set forth in claim 13, wherein the control means comprises an operation switch operated when the gear ratio is selected in the secondary transmission and a switching relay including two contacts and a control coil, one of the contacts being connected to one end of the first switch through one of the solenoids of the first and second solenoid valves and the other of the contacts being connected to the one end of the first switch through the other of the solenoids, and switching between the two contacts being performed by the control coil excited in response to operation of the operation switch.

15. A control device as set forth in claim 10, wherein the control means controls current passing through the solenoids of the respective first and second solenoid valves to control the selection of the gear ratio performed by the diaphragm.

16. A control device as set forth in claim 14, wherein the control means controls current passing through the solenoids of the respective first and second solenoid valves to control the selection of the gear ratio performed by the diaphragm.

17. A control device as set forth in claim 10, wherein the detect means includes a second switch closed when the selection of the gear ratio to a first situation is accomplished and a third switch closed when the selection of the gear ratio to a second situation is accomplished, and one ends of the respective second and third switches are connected to one ends of the respective solenoids of the first and second solenoid valves.

18. A control device as set forth in claim 14, wherein the detect means includes a second switch which is closed when the selection of the gear ratio to a first situation is accomplished and a third switch which is closed when the selection of the gear ratio to a second situation is accomplished, and one end of the respective second and third switches is connected to one end of the respective solenoids of the first and second solenoid valves.

19. A control device as set forth in claim 17, wherein the signal sound generator comprises a buzzer relay, the buzzer relay including a control coil connected to the one end of the second and third switches and excited by a closing of the second switch or the third switch, and a buzzer connected to a relay switch of the buzzer relay and worked by a closing of the relay switch.

20. A control device as set forth in claim 18, wherein the signal sound generator comprises a buzzer relay, the buzzer relay including a control coil connected to the one end of the second and third switches and excited by closing of the second switch or the third switch, and a buzzer connected to a relay switch of the buzzer relay and worked by a closing of the relay switch.

21. A control device controlling selection of gear ratio in a secondary transmission including a clutch, comprising:
(a) drive means for performing selection of the gear ratio in the secondary transmission;
(b) a clutch sensor detecting a disconnected situation of the clutch and comprising a first switch switched on when the clutch is subjected to its disconnection;
(c) control means for controlling the drive means in response to a detect signal detected by the clutch sensor to select the gear ratio only when the clutch is placed in its disconnected situation, whereby the secondary transmission is prevented from being injured due to a driver's misoperation;
(d) detect means for detecting completion of the selection of the gear ratio in the secondary transmission and including a second switch which is closed when the selection of the gear ratio to a first situation is accomplished and a third switch which is closed when the selection of the gear ratio to a second situation is accomplished;
(e) a signal sound generator continuing to generate signal sound in response to a detect signal detected by the detect means until the selection of the gear ratio is accomplished; and
(f) a first indicating lamp connected to one end of the second switch and lighted when the second switch is closed, and a second indicating lamp connected to one end of the third switch and lighted when the third switch is closed.

22. A control device as set forth in claim 21, wherein the drive means comprises an actuator, the actuator including a diaphragm for performing the selection of the gear ratio and a first and a second air chamber formed at both sides of the diaphragm, a first and a second solenoid valves, pressure-regulating openings thereof being connected respectively to the first air chamber and the second air chamber and high-pressure openings thereof being opened to the atmosphere, and a vacuum pump connected to low-pressure openings of both the first and the second solenoid valves.

23. A control device as set forth in claim 22, wherein each of the high-pressure openings of the first solenoid valve and second solenoid valve is opened to the atmosphere through a filter.

24. A control device as set forth in claim 22, wherein the control means comprises an operation switch operated when the gear ratio is selected in the secondary transmission and a switching relay including two contacts and a control coil, one of the contacts being connected to one end of the first switch through one of the solenoids of the first and second solenoid valves and the other of the contacts being connected to the one end of the first switch through the other of the solenoids, and switching between the two contacts being performed by the control coil when excited in response to operation of the operation switch.

25. A control device as set forth in claim 21, wherein the signal sound generator comprises a buzzer relay, the buzzer relay including a control coil connected to the one end of the second and third switches and excited by a closing of the second switch or the third switch, and a buzzer connected to a relay switch of the buzzer relay and worked by closing of the relay switch.

26. A control device as set forth in claim 25, wherein the signal sound generator comprises a buzzer relay, the buzzer relay including a control coil connected to the one end of the second and third switches and excited by closing of the second switch or the third switch, and a buzzer connected to a relay switch of the buzzer relay and worked by closing of the relay switch.

27. A device as in claim 1 further comprising means for detecting completion of the selection of the gear ratio in the secondary transmission.

28. A device as in claim 27 further comprising means for indicating said completion.

* * * * *